United States Patent [19]

Johnson

[11] Patent Number: 4,800,667

[45] Date of Patent: Jan. 31, 1989

[54] ILLUMINATED FISHING NET

[76] Inventor: Timothy B. Johnson, P.O. Box 54, Benedict, Minn. 56436

[21] Appl. No.: 34,839

[22] Filed: Apr. 3, 1987

[51] Int. Cl.⁴ .............................................. A01K 75/02
[52] U.S. Cl. .......................................... 43/17.5; 43/11
[58] Field of Search ................... 43/11, 17.5; 362/206, 362/189, 205

[56] References Cited

U.S. PATENT DOCUMENTS

| | | | |
|---|---|---|---|
| 2,143,558 | 1/1939 | Joers | 362/206 |
| 2,335,852 | 12/1943 | Frank | 362/206 |
| 2,420,087 | 5/1947 | Meek | 43/11 |
| 2,666,894 | 1/1954 | Babernitsh | 362/206 |
| 2,817,175 | 12/1957 | Morris | 43/11 |
| 3,077,693 | 2/1963 | Wallin | 43/11 |
| 3,835,272 | 9/1974 | Wisenbaker | 362/206 |
| 4,281,368 | 7/1981 | Humbert | 362/205 |
| 4,484,253 | 11/1984 | Roberts | 362/205 |

*Primary Examiner*—M. Jordan
*Attorney, Agent, or Firm*—Warren A. Sturm

[57] ABSTRACT

An illuminated fish net is comprised of a central, substantial body structure which receives and provides operative inter-engagement between a loop for receiving a net and a handle as well as interiorly disposed illuminating means including a light, batteries and a switch that is actuatable from the end of the handle.

10 Claims, 1 Drawing Sheet

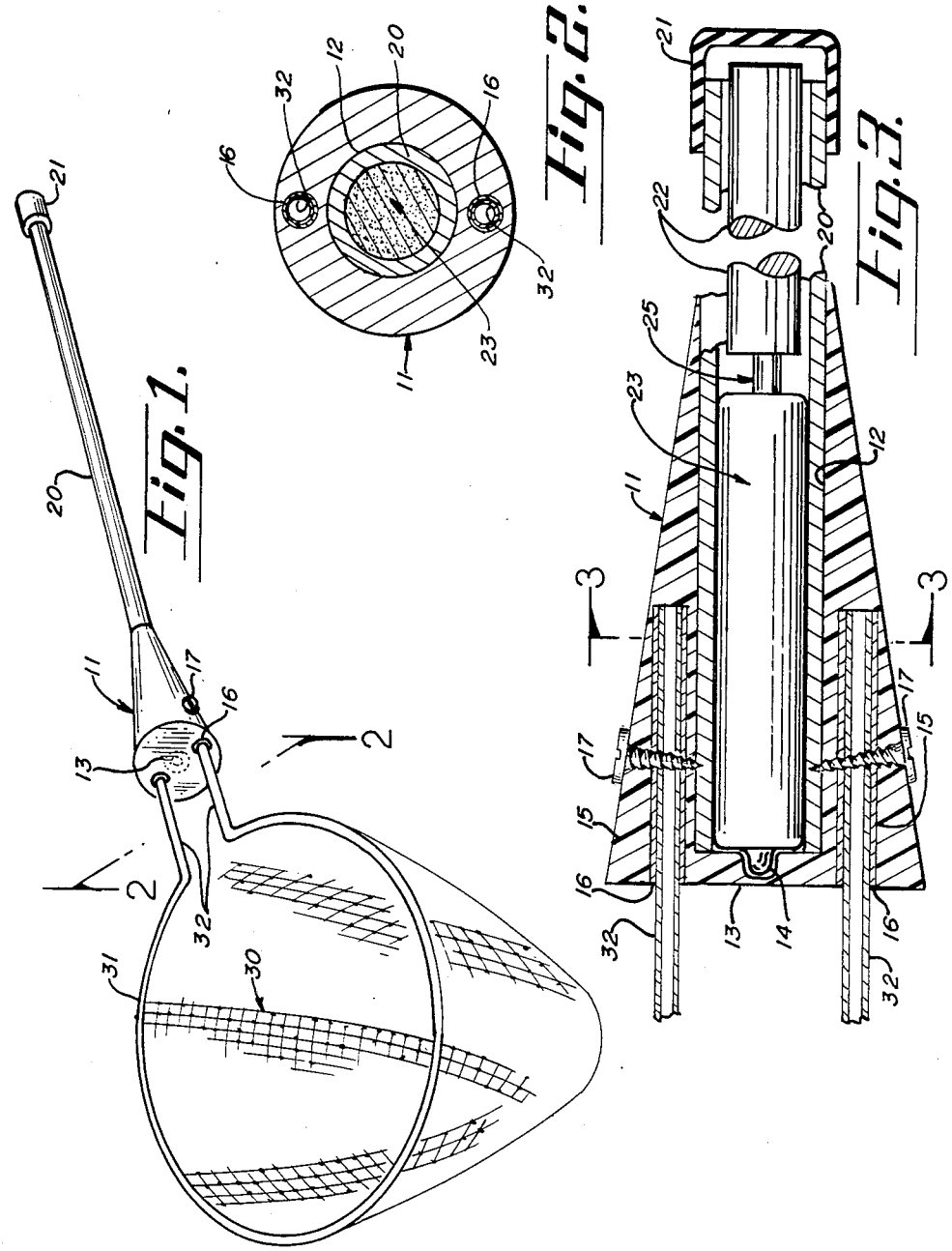

ILLUMINATED FISHING NET

BACKGROUND OF THE INVENTION

1. Field of the Invention

This invention is related to fishing nets and is more particularly directed toward an improved fishing net that may be operable under semi- or wholly-dark conditions to provide a light source for a fisherman in operating a net to aid in capturing a fish.

2. Prior Art

The following is a list of prior art noted in the course of preliminary patenability search:

| Number | Date | Inventor | For |
| --- | --- | --- | --- |
| 2,791,676 | May 7, 1957 | Cote | Light-Containing handle for Fishing Equipment |
| 3,364,610 | Jan. 23, 1968 | Poole | Fishing and Continuity Light |
| 2,420,087 | May 6, 1947 | Meek | Fish Landing Net |
| 3,077,693 | Feb. 19, 1963 | Wallin | Fish Dip Net |
| 2,817,175 | Dec.24, 1957 | Morris | Landing Net |

The above noted patents fail to disclose fishing net structures which provide the advantages of applicant's novel and unobvious invention as will be set forth below.

BRIEF DESCRIPTION OF THE INVENTION

My apparatus is comprised of a rugged, rigid body member that is provided with apertures adapted to coact with a handle and a fishing net loop to provide an improved fishing net structure which is easy and inexpensive to fabricate while providing an improved strength and ease of operation when utilized for the intended purpose.

The body member may be comprised, at one end, of transparent or translucent material to transmit light from an interiorally mounted and disposed illumination means in the form of a battery operated light bulb which may, in turn, be energized by a push-button switch that is operable in response to movement of an actuator extending through a hollow handle and covered by a waterproof flexible housing at the opposite end of the handle so that the light may be selectively operable by a fisherman as by pushing on the end of the handle with a thumb, grasping the handle or the body portion of the fishing net and pushing the end of the handle against the fisherman's body or on any hard surface.

It is therefore an object of my invention to provide an improved fishing net.

Another object of my invention is to provide an improved illuminated fishing net.

A still further object of my invention is to provide a fishing net that may be illuminated that is easy and inexpensive to fabricate and exhibits improved structural and operability characteristics.

These and other objects of my invention will become apparent from a consideration of the appended specification, claims and drawings in which:

FIG. 1 is a perspective sketch of my improved fishing net;

FIG. 2 is an enlarged fragmentary sectional view taken along section line 2—2 on FIG. 1 of the drawings; and FIG. 3 is a sectional view taken along section line 3—3 in FIG. 2 of the drawings.

Referring now to the drawings, my fishing net is indicated generally by reference character 10 and includes a body 11, handle 20 and a net 30.

Body 11 is longitudinally elongated and may assume a generally tapered configuration from one end to the other and includes a centrally disposed aperture or hole 12 that may preferably be closed at, for example, the left end in FIG. 2 of the drawings and this may be conveniently be referred to as lighted end 13 of body 11. A source of light 14 is shown disposed adjacent and extending into a transparent portion 13 of body 11. Body 11 also is provided with a pair of longitudinally extending apertures extending through lighted end 13 into the centrally disposed body portion and each of them are lined with suitable material, such as a metallic tube 16, to form a liner for slidably receiving the ends of a net loop assembly to be described below. A pair of screw-threaded members 17 extend through the side periphery and laterally inwardly through liner 16, net loop holes 15 and into a hollow handle 20 (to be described below).

A longitudinally elongated hollow handle 20, comprised of suitable material such as polyvinyl chloride tubing, metallic pipe or the like, is shown disposed in longitudinal central aperture 12 of body 11 and extending outwardly therefrom to an end enclosure comprised of flexible weatherproof material and indicated by reference character 21. A longitudinally elongated switch actuator 22 is shown disposed on the interior of handle in engagement, at one end, with a switch 25 and at the other, outer end with the end portion of end enclosure 21 on handle 20.

A light assembly 23 including a lamp 14 is shown disposed in the end of handle 20 that is in turn disposed within body 11. Light assembly 23 includes a switch at one end and typically includes (not shown) a source of power, such as a battery, and suitable connections extending from switch 25 to light 14 to provide a means for energizing the light from the source of power in accordance with the state or status of switch 25.

A net 30 is shown disposed on a net loop 31 having a pair of ends 32 extending into net loop hole liners 16 in net loop holes 15. As may be seen in the enlarged fragmentary portions of FIG. 2, screw-threaded fasteners 17 extend through ends 32 when in the assembled relationship.

Body 11 may, for example, be molded of suitable plastic material with net loop hole liners 16 molded in place and lighted end 13 configured to accept the end of a lamp 14 to disposed lamp 14 in suitable location to illuminate the opening formed by the major portions of net loop 31, when lamp 14 is energized. Net loop 31 may conveniently be comprised of metallic tubing or metallic rod material and actuator 22 for switch 25 is dimensioned to be received within the length of hollow handle 20 so that it normally extends somewhat beyond the end of handle 20 into the interior of end enclosure 21.

I claim:

1. An illuminated fishing net comprising in combination:

a longitudinally elongated body having a centrally disposed aperature and longitudinally extending aperatures opening outwardly of one end and disposed generally parallel to said centrally disposed aperture;

an elongated hollow handle having a first end in the centrally disposed aperture in said body;

illuminating means disposed in said first end of said handle and including operating means therefor, accessible from the interior of the other end of said handle;

longitudinally elongated means for operating said operating means in said illuminating means slidably disposed within said other end of said handle;

flexible, resilient sealing means disposed over said other end of said handle;

an open ended loop for receiving a net and including ends disposed in the longitudinally extending apertures in said body; and means interconnecting said body, said ends of said loop, the first end of said handle and said illumination means.

2. The subject matter of claim 1 in which the illuminating means is a battery powered incandescent lamp.

3. The subject matter of claim 1 in which the resilient sealing means over the other end is a rubber hemispherically shaped end cap.

4. The subject matter of claim 1 in which a pushbutton switch activates the illumination means when the other end of the handle is pushed.

5. The subject matter of claim 1 in which the illuminating means is a battery powered fluorescent lamp.

6. A lighted landing net comprising a net portion, a handle portion and an illuminating portion;

said net portion having a rigid loop, two parallel loop pins extending from said rigid loop, and mesh netting attached to said rigid loop;

said handle portion having an elongated hollow handle with a first end connected to said illuminating portion; and an illuminating portion comprising a solid connector base, two pin slots of such dimensions to receive said parallel loop pins, and illumination means located between said pin slots, an illumination cavity in said connector base to enclose said illumination means, a handle slot such that said hollow handle may be inserted in said connector base with said hollow handle surrounding said illumination means and said loop pins adjacent said hollow handle, fastening means to simultaneously connect said connector base with said handle, said loop pins and said illumination means.

7. The subject matter of claim 6 in which the connector base is constructed of transparent material such that the illuminating means shines through the connector base.

8. The subject matter of claim 6 in which the illuminating means is a battery powered incandescent lamp.

9. The subject matter of claim 6 in which the illuminating means is a battery powered fluorescent lamp.

10. A lighted landing net comprised of a net portion, and a handle portion attached to said net portion;

said net portion having a rigid loop and a net attached to said rigid loop;

said handle portion consisting of a tubular handle including:

a light unit inserted into the net side of said tubular handle, whereby light is directed toward said net portion;

a pushbutton switch attached to said light opposite the net side of said light unit;

a switch actuating rod extending through said tubular handle from said pushbutton switch to a short distance beyond the end of said tubular handle opposite the net side; and a flexible end cap surrounding the end of said tubular handle and enclosing the portion of said switch actuating rod which extends beyond said tubular handle, whereby said light may be lighted by pushing said flexible end cap.

* * * * *